United States Patent [19]

Anderson

[11] Patent Number: 5,503,305

[45] Date of Patent: Apr. 2, 1996

[54] REUSABLE PRESSURIZABLE LIQUID DISPENSING SPHERE

[75] Inventor: Keith A. Anderson, East Grand Forks, Minn.

[73] Assignee: AGSCO Incorporated, Grand Forks, N. Dak.

[21] Appl. No.: 227,775

[22] Filed: Apr. 13, 1994

[51] Int. Cl.$^6$ ........................................... B67D 5/06
[52] U.S. Cl. .................... 222/180; 222/400.8; 220/582
[58] Field of Search ................ 222/400.7, 400.8, 222/173, 397, 1, 180; 220/303, 366, 466, 469, 582; 248/146, 154

[56] References Cited

U.S. PATENT DOCUMENTS

| | | | |
|---|---|---|---|
| 2,036,310 | 4/1936 | Werder | 222/400.7 X |
| 2,402,175 | 6/1946 | Mapes | 248/154 |
| 2,423,295 | 7/1947 | Grabbe et al. | 220/366 X |
| 2,504,009 | 4/1950 | DePhillips et al. | 222/397 X |
| 3,148,800 | 9/1964 | Isnardi et al. | 222/180 X |
| 3,302,822 | 2/1967 | Edwards | 220/366 X |
| 3,805,988 | 4/1974 | Walker et al. | 248/146 X |
| 3,843,027 | 10/1974 | Wilson et al. | 222/400.7 |
| 4,867,348 | 9/1989 | Dorfman | 222/173 |
| 5,038,959 | 8/1991 | Patel | 220/366 |
| 5,108,015 | 4/1992 | Rauworth et al. | 222/400.7 |
| 5,137,162 | 8/1992 | Fritz | 215/31 |
| 5,174,343 | 12/1992 | Rood | 141/18 |
| 5,199,472 | 4/1993 | Rollison | 141/65 |
| 5,335,821 | 8/1994 | Osgar | 222/400.7 X |

FOREIGN PATENT DOCUMENTS 3602689  8/1987  Germany ........................ 220/466

*Primary Examiner*—Andres Kashnikow
*Assistant Examiner*—Lisa Douglas
*Attorney, Agent, or Firm*—Curtis V. Harr

[57] ABSTRACT

A spherical liquid dispensing system which can easily be handled by one person. This system is made from a substantially uniformly molded sphere supplied with a reinforced neck for filling and dispensing. The sphere further has a flange about its outer circumference to facilitate mounting in a stackable rectangular support frame. This spherical liquid dispensing system can be supplied with a standard solid cap or a cap with valves including a first valve to allow for the pressurization of the sphere, a second valve to dispense the contained liquid and a third valve for pressure relief. The threads and sealing surface on the neck of the sphere are designed to release contained pressure before releasing the cap and to vent the contained pressure downward from the cap.

4 Claims, 5 Drawing Sheets

REUSABLE PRESSURIZABLE LIQUID DISPENSING SPHERE

BACKGROUND OF THE INVENTION

This invention relates generally to the field of dispensing liquids and more particularly to a reusable pressurizable container for dispensing various liquid chemicals.

The agriculture industry uses a great deal of chemicals in many applications. Farm chemicals cover a wide spectrum ranging from fungicides that are used to treat seed before planting to herbicides that are highly diluted with water and applied directly by spraying the plants. The environmental push in the last few years has lead to many changes in the methods used for transporting, mixing and storing these often times highly toxic chemicals.

The most widely used method of transporting and storing these chemicals has been the use of disposable plastic cans or jugs ranging in size from one to five gallons. With the wide use of farm chemicals the number of plastic containers that a farmer must dispose of can create an enormous burden on the farmer as well as the environment. In certain states farmers may be required to clean these plastic containers which can result in spillage and exposure of the toxic chemicals to the farmer and the environment as well as adding another job to the farmers schedule creating a loss of valuable time during an extremely busy portion of the year. Other states go even further in regulating the disposal of these empty chemical containers by requiring that farmers return the clean containers to the chemical dealer for disposal.

The usual method of dispensing chemicals from jugs is to remove the cap and simply pour out the desired amount of chemical. This method of dispensing chemicals often results in direct spillage of the concentrated chemical on the farmer or his equipment. These chemicals are highly toxic and the effects of these small spills is certainly serious.

Still another method of transporting and dispensing farm chemicals is through the use of large returnable containers or caddies often made of plastic. These caddies range in size from fifty to two hundred gallons. Although these caddies solve the problem of disposal found in the smaller jugs they are extremely hard to handle and require the use of a mechanical lift to load and unload them from transport vehicles.

A third type of container is the steel or aluminum keg these are often in the ten to twenty gallon size and can be cumbersome and heavy when full of liquid.

For the foregoing reasons, it was desired to design a new reusable chemical dispensing system that is easily handled by a single person, is relatively spill free and lastly inexpensive to manufacture. It was also desirable to have a new liquid dispenser that could be used in other industries such as the medical field where the container could be used to hold and dispense medical chemicals. This container could also be used to dispense cleaning chemicals as well as automotive fluids. In short this container can be used in almost any field that requires a low cost means of handling and safely dispensing bulk quantities of liquid.

SUMMARY OF THE INVENTION

The objects of this invention of providing a reusable, easily handled, safe and inexpensive chemical dispensing container are accomplished by providing a spherically shaped chemical holding tank capable of withstanding pressure. This tank is supplied with a neck designed to receive a cap for filling and dispensing of the liquid. The tank is further supplied with two types of caps the first cap is a solid storage cap. The second cap contains three valves for pressurizing, depressurizing and dispensing the chemical. The sphere is finally mounted within a rectangular support frame for protection and ease of handling.

The sphere is ideally uniformly molded from a chemically resistant material such as a fluorinated, high density polyethylene copolymer of a high molecular weight one such material is marketed under the trademark FORTIFLEX™ K44-11-128. However, depending on the type of chemical to be used in the tank other materials may be used to achieve the same results. The sphere is further molded with coordinated markings on the side to allow the present volume to easily be read. The neck of the spherical tank is molded onto the sphere and reinforced at the joint with a reverse buttress. The sphere's neck is provided with threads for a sealing cap. The neck is also provided with a recessed flat upper sealing surface to mate with the cap to provide a seal capable of withstanding substantial pressure. The threads of the sphere's neck and its upper sealing ridge are further provided with a groove running substantially perpendicular to the threads of the neck. The purpose of this groove is to provide a vent to release built up pressure when the cap is partially removed. These channels in the threads vent the built up gas downward when the seal is first broken between the cap and the recessed flat upper sealing surface. The sphere is further molded with a rectangular flange about its circumference to provide a means of mounting it within a support frame.

The support frame may be molded out plastic and made in one solid piece or may be assembled out of various pieces and made from any light strong material suited for a support structure. The flange of the sphere is mounted within the support frame using non-corrosive right angle brackets and a plurality of non-corrosive fasteners.

The caps for the tank can be of various types. The caps may typically be made from a glass filled poly-propylene. The first type of cap that is often used is a standard solid type cap which can be used for storage or transportation. The second type of cap is one that is fitted with various valves for pressurizing and dispensing the liquid within the sphere. Although various caps can be used for this purpose the ideal cap is one that is readily available in the industry this cap has an inlet for pressurized air that can be supplied by an air compressor or a compressed air tank as well as other sources. The cap is further fitted with a relief valve to prevent the over pressurization of the spherical tank. The final valve on the cap is supplied with a tube that extends down into the sphere and allows for the dispensing, under pressure, of the contained liquid. The particular type of fittings used on these valves can vary with the air source as well as the type of arrangement that a particular user has.

DESCRIPTION OF THE PREFERRED EMBODIMENT

Figure 1:
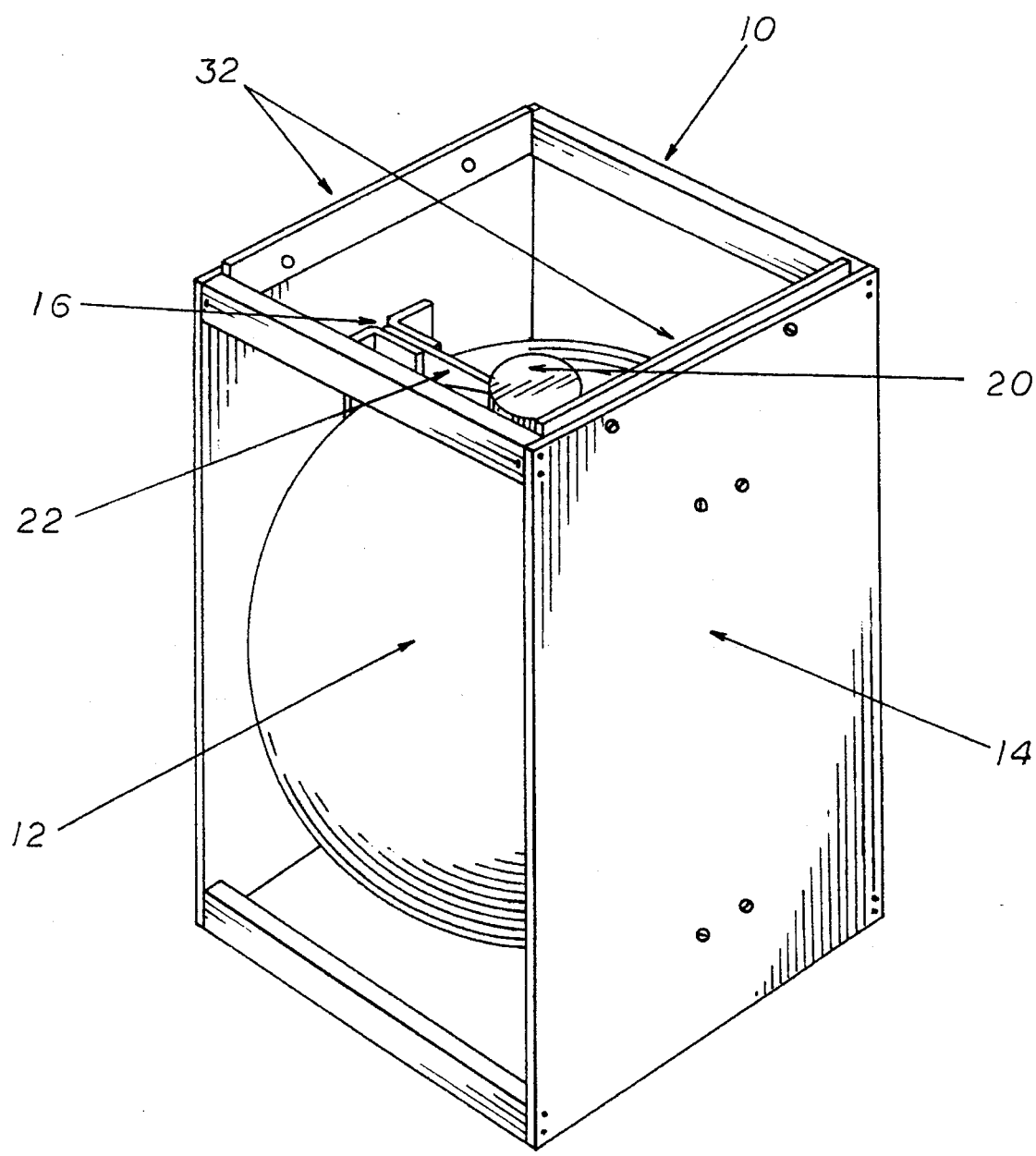
FIG. 1 is a perspective view of one embodiment of a spherical liquid dispensing system constructed in a manner that is in accordance with the present invention. This figure illustrates the use of the standard cap on the sphere.
Figure 2:
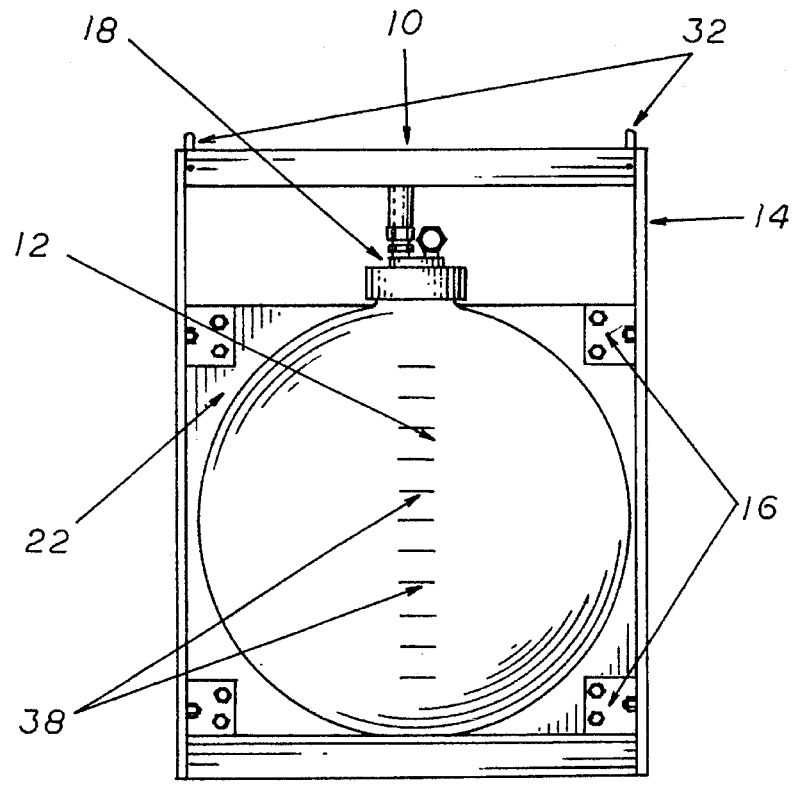
FIG. 2 is a side elevation view of the spherical liquid dispensing system shown in FIG. 1 and is shown with the valve cap assembly that is used with the spherical liquid dispensing system when it is in use.
Figure 3:
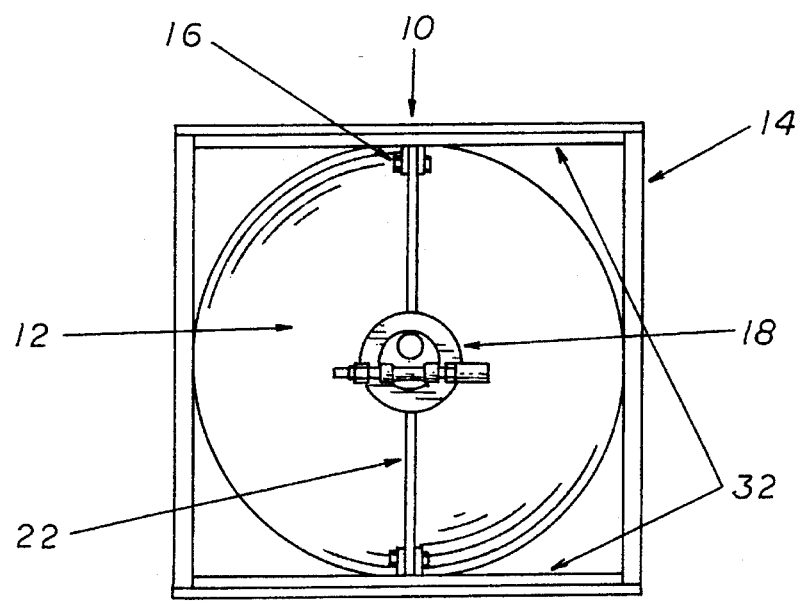
FIG. 3 is a top elevation view of the spherical liquid dispensing system shown in FIG. 1 and is shown with the valve cap assembly that is used with the spherical liquid dispensing system when it is in use.

Referring to the accompanying drawings, a spherical liquid dispensing system as used in the application of liquid chemicals embodying various features of the present invention is shown. In the illustrated embodiment, the component of the liquid chemical applicator apparatus comprises a spherical liquid dispensing system 10. It must be stated that the present invention is equally applicable to other applications in which it is desirable to use air pressure to dispense storable liquids in an even and uniform manner.

As shown by the drawings in FIGS. 1, 2, 3, and 4 a spherical liquid dispensing system 10 comprises a plastic sphere 12 having a molded square flange 22 (the length of an edge of the flange 22 being the same as the outside diameter of the sphere 12) along its vertical axis. The sphere 12 is mounted within support frame 14 by means of mounting brackets 16 which fasten with non-corrosive bolts or other fasteners to the side walls of support frame 14 and to the molded flange 22 which is in turn a part of sphere 12. Sphere 12 may further be supplied with coordinated markings 38 molded upon said sphere's side to measure volume.

Figure 4:
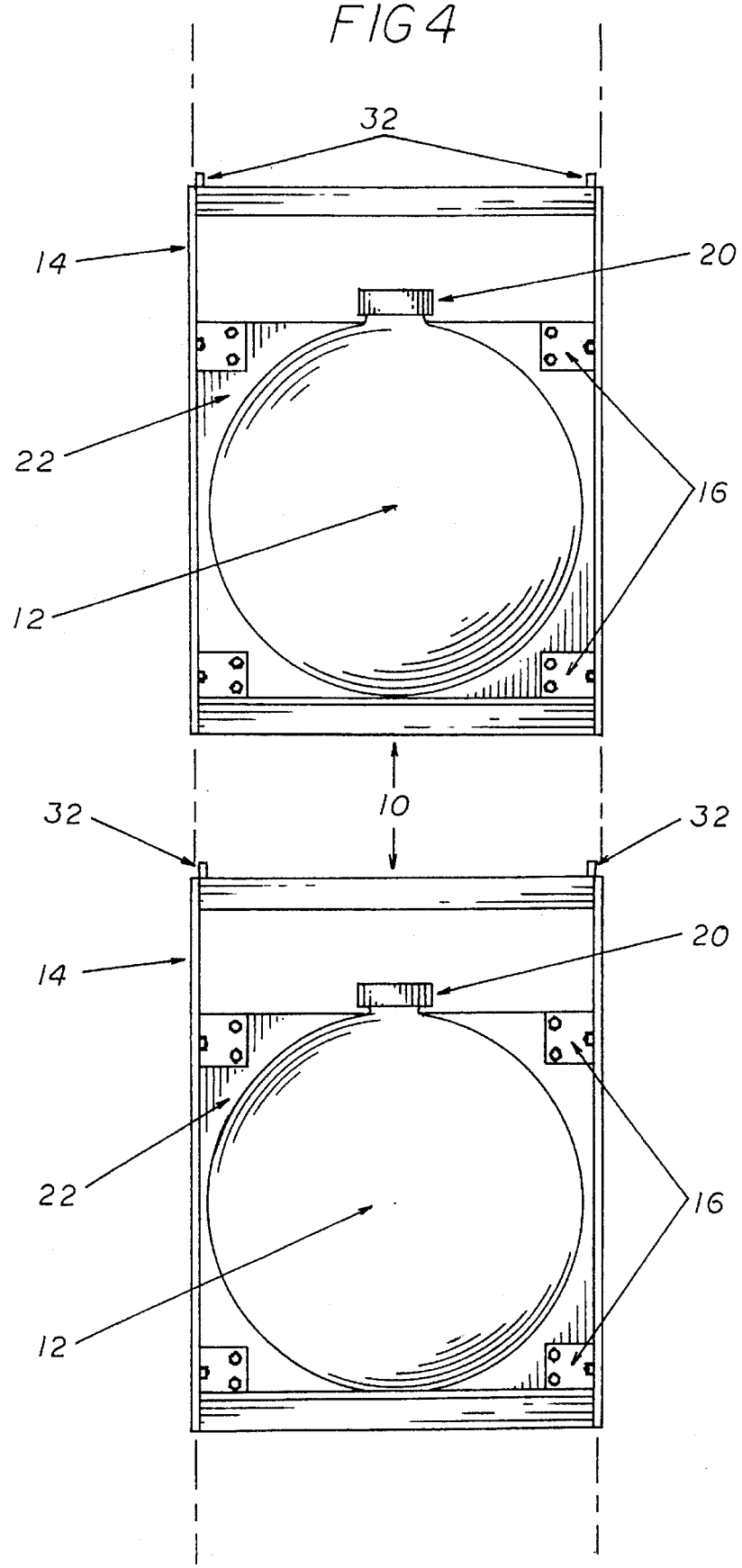
FIG. 4 is a side elevation view of two spherical liquid dispensing systems shown in FIG. 1 and shows how the individual units may be stacked on top of each other by use of the built in stacking apparatus.

As shown in FIG. 4 spherical liquid dispensing system 10 is fitted with stacking flanges 32 which are attached inside of the top edge of the outside wall of the support frame 14 and fit inside of the bottom edge of outside wall of support 14 and allow individual spherical liquid dispensing systems 10 to stacked on top of one another during storage.

As shown in FIGS. 1, 2, 3, 4, and 5 there are two caps that fit neck 24 of spherical liquid dispensing system 10, they are standard cap 20 (used when the spherical liquid dispensing system 10 is in storage and not in use), and valve cap 18 (used to apply air pressure to spherical liquid dispensing system 10 and to distribute the liquid contained therein when liquid dispensing system 10 is in use).

Figure 5:
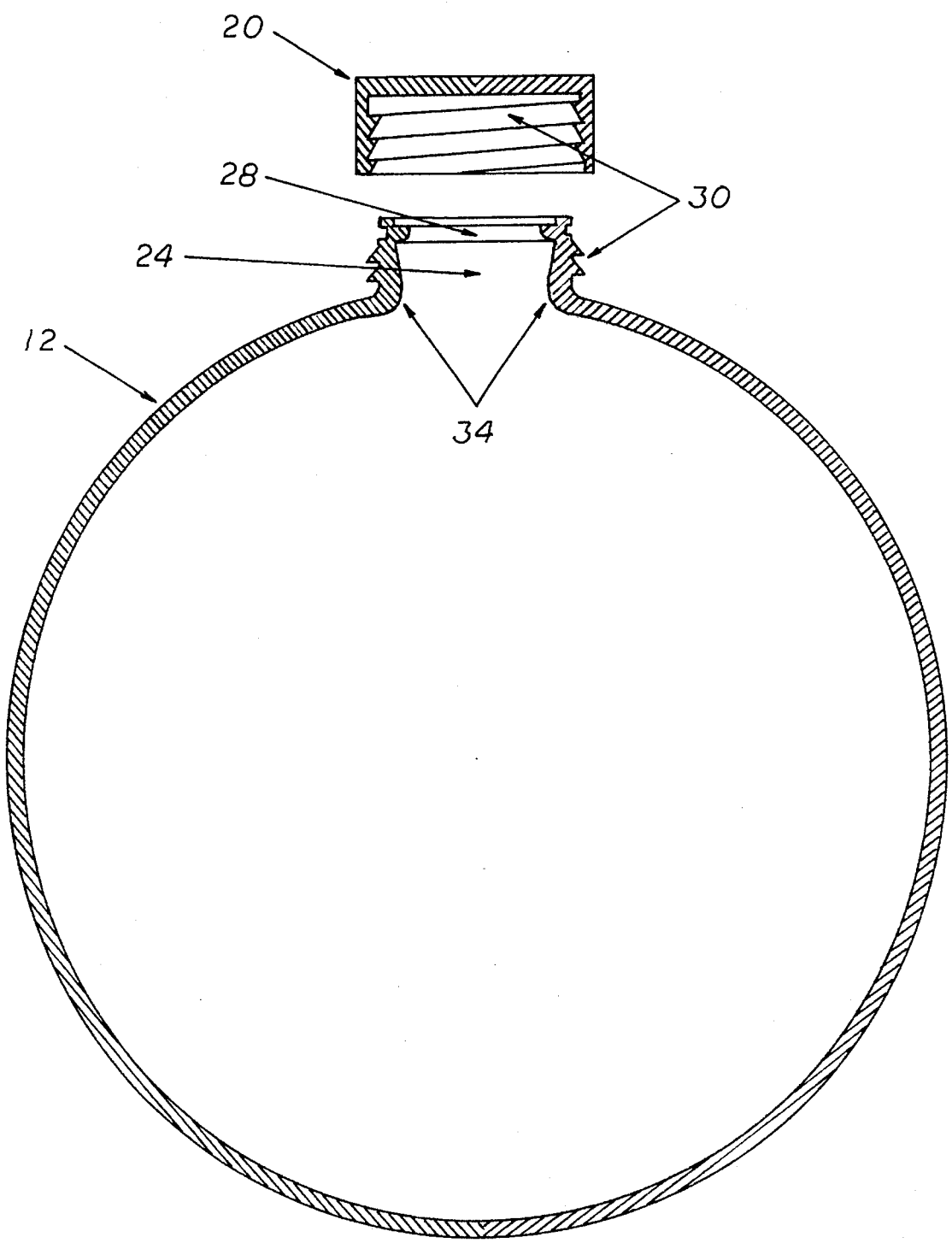
FIG. 5 is a side sectional view of the ball assembly of the full unit showing the nature of the construction of the ball, the neck of the ball, the threads of the neck and cap, and the sealing apparatus of the neck and cap.

As shown in FIG. 5 neck 24 is constructed with thicker material or a reverse buttress 34 to compensate for increased pressure at this point of sphere 12. Neck 24 also has an inner recessed flat sealing area 28 which mates with valve cap 18 or standard cap 20 to seal spherical liquid dispensing system 10 and the contents therein from the external environment. Both neck 24 and caps 18 and 20 are constructed with threads 30 that have flat lower edges which also aid in the sealing of spherical liquid dispensing system 10.

Figure 6:
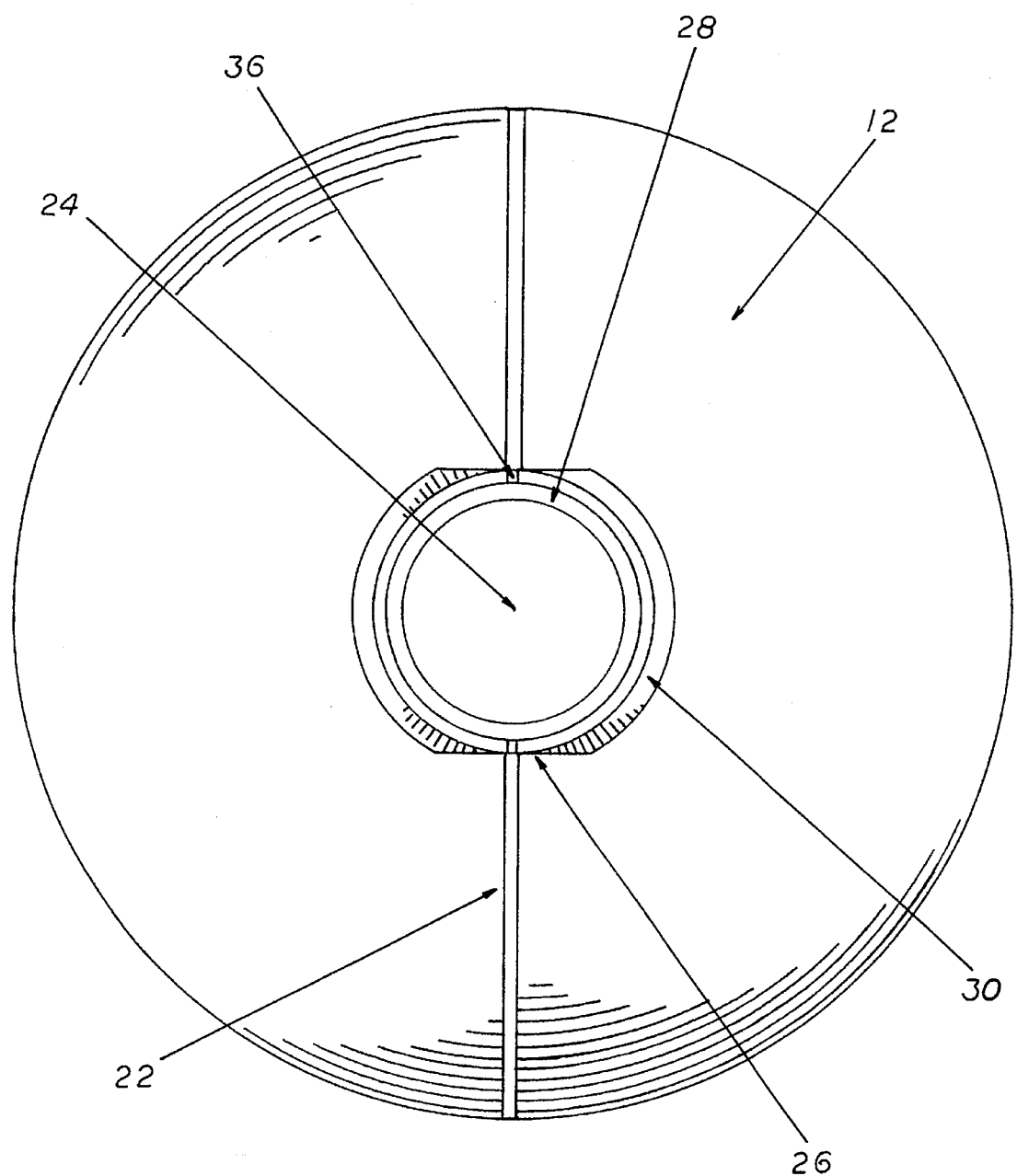
FIG. 6 is a top elevation view of the ball assembly of the liquid dispensing sphere showing the nature of construction of the ball, the ball flange, the neck of the ball, the threads on the neck, the sealing apparatus of the neck, and the venting apparatus of the neck of the ball.

As shown in FIG. 6 neck 24 is constructed with groove 36 on its upper most surface immediately above inside sealing ring 28, and flat spot 26 on threads 30 which allow any residual pressure contained within the spherical liquid dispensing system 10 to escape prior to the complete removal of valve cap 18 or standard cap 20.

Although present invention has been described in considerable detail with reference to certain preferred versions thereof, other versions are possible. For example, the materials used may be varied depending upon the type of liquid to be used. Another variation is the type of cap used to pressurize and dispense the liquid as numerous valves and connections are widely available. Yet a further variation would contemplate different types of rectangular crates used as support frames. A still further variation would be the use of a decal versus molding the coordinated filling marks directly on the sphere. Therefore, the spirit and scope of the appended claims should not be limited to the description of the preferred versions contained herein.

I claim:

1. A reusable Pressurizable spherical liquid dispensing system comprising:

a spherical holding tank which is capable of withstanding pressure;

a rectangular flange about the circumference of said spherical holding tank;

a neck on said spherical tank for filling and dispensing of said liquid;

a means of dispensing said liquid from said neck;

a support frame for said tank said support frame being substantially rectangular and having an upper and lower portion; and a plurality of mounting brackets attached to the flange of said spherical tank and said support frame with fasteners.

2. A liquid dispensing system as in claim 1 wherein said sphere is made of a chemically resistant material such as a fluorinated high density polyethylene copolymer of a high molecular weight.

3. A liquid dispensing system as in claim 1 wherein the means of dispensing said liquid from said neck is a valve cap with a first valve for receiving a source of pressurized air for building a pressure head with said spherical tank, a second valve for relief of excess pressure and a third valve for liquid dispensing.

4. A reusable pressurizable spherical liquid dispensing system comprising:

a spherical holding tank made of a chemically resistant material, said tank further being capable of withstanding pressure;

a rectangular mounting flange about the circumference of said spherical tank;

a neck on said spherical tank for filling and dispensing of said liquid, said neck having a recessed flat upper sealing surface, threads for receiving a storage cap or dispensing means about the outer surface of said neck and a reverse buttress joint between said neck and said spherical tank;

a valve cap;

a substantially rectangular support frame for said tank, said frame having an upper and lower portion, said upper portion having a flange for receiving the lower portion of a second frame when stacking; and a plurality of mounting brackets attached to the flange of said spherical tank and said support frame with fasteners.

\* \* \* \* \*